C. H. PELTON.
GRAIN SEED CUP.
APPLICATION FILED MAY 1, 1920.
1,359,738.
Patented Nov. 23, 1920.
2 SHEETS—SHEET 1.
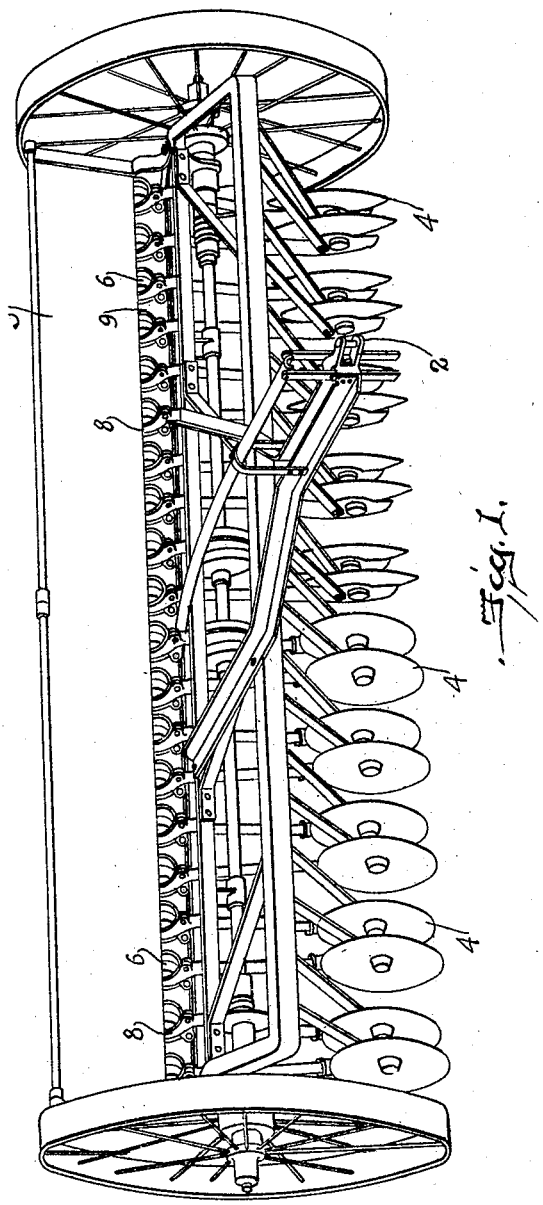
INVENTOR.
Charles H. Pelton,
BY
ATTORNEYS.

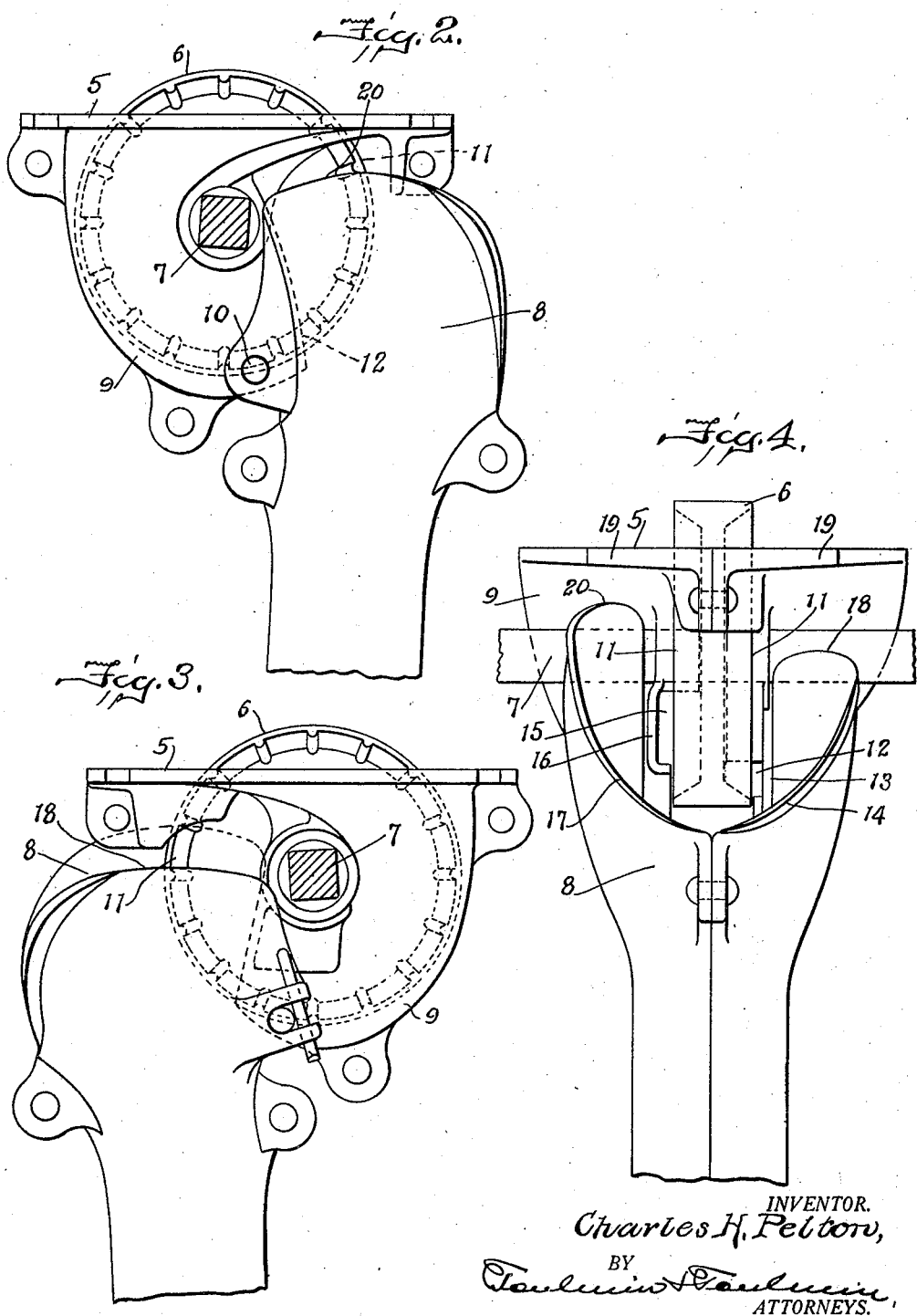

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

GRAIN SEED-CUP.

1,359,738.  Specification of Letters Patent.  Patented Nov. 23, 1920.

Application filed May 1, 1920. Serial No. 378,276.

*To all whom it may concern:*

Be it known that I, CHARLES H. PELTON, a citizen of the United States, residing at Springfield, in the county of Clark and State of Ohio, have invented certain new and useful Improvements in Grain Seed-Cups, of which the following is a specification, reference being had therein to the accompanying drawing.

This invention relates to the adaptation of grain seed cups in seeding machines to that type of such machines which are drawn by power or tractors.

The object in view is to afford the operator of the tractor from his station in advance of the grain drill a clear and unmistakable observation of the grain in its passage from the feeding cup to the tube top.

And a further object in connection with thus affording the operator the desired observation of the grain is that of bringing the upper surface of the tube top in closer relation to the bottom of the feed cup on that side which is devoted to feeding oats, clover and grains lighter than wheat, this closer relation of the parts being for the purpose of shielding said lighter grain from the wind.

In the accompanying drawings, Figure 1 is a perspective view of a grain drill provided with an acceptable hitch or coupling for attachment to a tractor, with my improved seed cup mounted thereon;

Fig. 2 is a side elevation of my seed cup and tube top looking toward the side which feeds oats, clover and grains lighter than wheat;

Fig. 3 is a similar elevation from the opposite side, that which feeds wheat; and Fig. 4 is a front elevation of the device entire, the wheat feeding side being on the right and the oats and other grain feeding being on the left.

As stated above, in the use of grain drills, and particularly large drills, or drills used on large farms where tractors are employed to draw the drills over the fields the tractor operator is stationed ahead of the drills. He rides on the tractor and the drill is behind him. It is important that he be able to inform himself as to whether the grain feeding devices are properly functioning or whether some of them have clogged up or for any cause have stopped feeding the grain. To this end he must be able to see whether or not the grain is being fed by a mere quick glance backward over his shoulder. It is to enable him to do this that I have made my invention.

At 1 I have shown a grain drill such as is adapted to be drawn by a tractor comprising a pair of ground wheels, a supporting axle, a frame thereon, draft devices connected to the frame, such as shown at 2, and the usual grain box 3 with the furrow openers 4 in the form of disks or otherwise, as the case may be.

On this conventional apparatus I mount and arrange my device comprising a seed cup 5 having mounted therein a feed wheel 6 carried by the usual feed shaft 7 which receives motion from suitable gearing operated by or through the ground wheel and axle.

In Fig. 4 the seed wheel 6 is shown within the tube top 8 pivoted to the grain cup 5 which, in turn, delivers the grain to the furrow openers whatever be their particular kind.

It will be seen from the figures in Sheet 2 that the tube top 8 is connected to the seed cup 5, at 9, by means of a pivot or bolt 10 and that the tube top embraces both sides of that portion 11 of the feed wheel 6 which is exposed beyond or outside of the seed cup 5. It will also be seen from Fig. 4 that the entire periphery of this portion of the feed wheel is exposed to view by an operator at the front of the machine by looking rearward. On the wheat side the wheat will discharge through the opening 12 between the feed wheel and the adjacent wall 13 of the cup and will be readily observable through the large open space above the rear upper margin 14 of the tube top.

It will also be observed from Fig. 4 that the oats, clover or grain lighter than wheat, which are fed through the larger opening 15 between the feed cup and the adjacent wall 16 of the cup will be readily observable in the open space above the upper rear margin 17 of the tube top.

Thus no matter what kind of grain is being fed it will be exposed to the view of the operator from a forward position by simply glancing back. If for any reason the flow ceases or the flow is insufficient he will observe the abnormal condition and can go and discover the cause and eliminate it.

It will further be observed that for the smaller and heavier grains, such as wheat, it is not necessary to carry the point 18 of the tube top so near the wall 19 of the seed cup, as in the case of the larger and lighter grains, such as oats and clover. For the latter the tube top at the point 20 is carried much nearer to the wall 19 of the seed cup. See Fig. 4. The reason for this is that in case of the wheat and other heavier seed the winds or drafts passing between the seed top and seed cup are less likely to blow them away, so that a wider space can be left and less metal be used in making the seed top. On the other hand, in the case of oats or other lighter seed the space must be narrower so that the winds or drafts will have less opportunity to blow away or divert such seed.

It will also be observed that while there is free observation of the grain of whatever kind is being fed, the tube top also being fashioned, as above described, protects the falling grain from wind drafts which would tend to blow the grain away before it could pass through the open space which affords the observation. By the described coördination of the several parts and by the positioning or relation of the device as a whole to the grain box, with this observation opening toward the front of the machine, I have produced an arrangement and construction by which the grain is properly protected and at the same time amply exposed to observation by the tractor operator at his station ahead of the drill.

Having thus fully described my invention, what I claim as new and desire to secure by Letters Patent, is:

1. In a grain drill, the combination, with a seed box, a seed cup and a seed wheel positioned with their grain discharge openings below and toward the front of the box, a seed tube and its top, the upper end of the top embracing the sides of the cup and wheel and extended forward and downward below the grain discharge openings to protect and give observation to the falling grain from points in front of the machine.

2. The combination, with a feed cup and its wheel having different sized discharge openings, of a tube top secured to the cup and with its upper portion embracing the sides of the cup and wheel, the tube top extending nearer to the cup on one side than on the other and having its upper edge extended forward and downward to a point below the discharge openings, whereby the discharging grain is protected and exposed to observation from the front side of the device.

In testimony whereof, I affix my signature.

CHARLES H. PELTON.